United States Patent
Howe

(10) Patent No.: US 9,170,341 B2
(45) Date of Patent: Oct. 27, 2015

(54) FLAME-PROOF RADIATION DETECTOR WITH WIRELESS COMMUNICATION MEANS

(71) Applicant: JOHNSON MATTHEY PUBLIC LIMITED COMPANY, London (GB)

(72) Inventor: Geoffrey Stuart Howe, Durham (GB)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/346,040

(22) PCT Filed: Sep. 21, 2012

(86) PCT No.: PCT/GB2012/052344
§ 371 (c)(1),
(2) Date: Mar. 20, 2014

(87) PCT Pub. No.: WO2013/045899
PCT Pub. Date: Apr. 4, 2013

(65) Prior Publication Data
US 2014/0231664 A1    Aug. 21, 2014

(30) Foreign Application Priority Data
Sep. 30, 2011    (GB) .................... 1116883.8

(51) Int. Cl.
*G01J 1/42* (2006.01)
*G01T 7/00* (2006.01)
*G01T 1/17* (2006.01)

(52) U.S. Cl.
CPC ... *G01T 7/00* (2013.01); *G01T 1/17* (2013.01); *Y10T 29/49002* (2015.01)

(58) Field of Classification Search
CPC .................................. G01T 7/00; G01T 7/17
USPC ......................................................... 250/395
See application file for complete search history.

(56) References Cited

U.S. PATENT DOCUMENTS

| 2002/0056809 A1 | 5/2002 | Frederick et al. |
| 2005/0023881 A1 | 2/2005 | Frederick et al. |
| 2009/0114833 A1 * | 5/2009 | Green et al. ................... 250/388 |

FOREIGN PATENT DOCUMENTS

| CN | 201945563 U | 8/2011 |
| DE | 122865 | 11/1976 |
| EP | 0108296 A1 * | 5/1984 |
| EP | 1158138 A2 | 11/2001 |

(Continued)

OTHER PUBLICATIONS

Unknown: "MultiRAE User's Guide", Product Manual, Jun. 2011, Retrieved from the Internet: URL: http://www.ribble-enviro.co.uk/includes/files/products/161_2_RAE%20Systems%20MultiRAE-Users%20Guide.pdf [retrieved on Nov. 27, 2012], pp. 7, 14-16, 45-46, XP002688181.

(Continued)

*Primary Examiner* — Kiho Kim
(74) *Attorney, Agent, or Firm* — Young & Thompson

(57) ABSTRACT

A radiation detector module includes a radiation detector, power source and wireless communication elements all housed within a flame-proof enclosure. The enclosure has a portion through which wireless transmissions can pass. The radiation detector module may be suitable for use in a hazardous area containing a potentially explosive gas mixture.

11 Claims, 1 Drawing Sheet

(56) References Cited

FOREIGN PATENT DOCUMENTS

Figure 1:
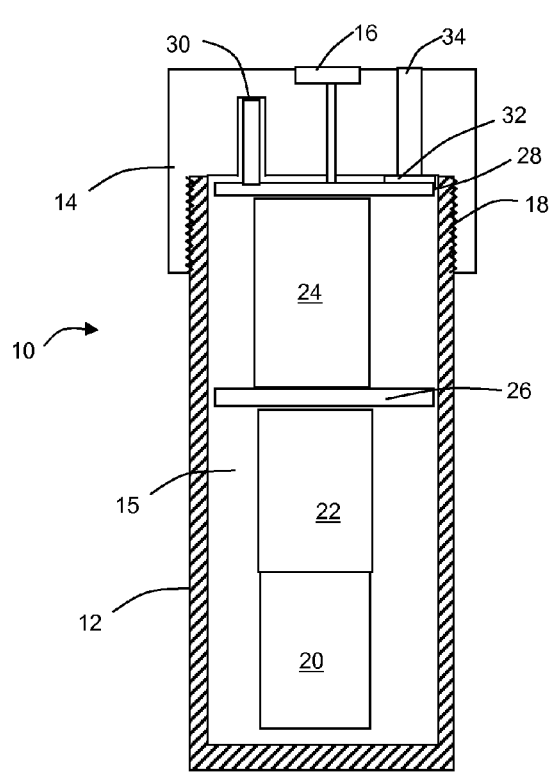

WO 0146556 A1 6/2001
WO 2011027171 A2 3/2011

OTHER PUBLICATIONS

Unknown: "Uni-Probe LB 491 Determination of Density and Concentration", Product Manual, Oct. 2007, Retrieved from the Internet: URL: http://www.berthold-us.com/industrial/literature%20and%20technical%20information/LB%20491_E.pdf [retrieved on Nov. 26, 2012] XP002688182.

Unknown: "Wireless HART—How it Works", Web Archive, Apr. 13, 2010, Retrieved from the Internet: URL: http://web.archive.org/web/20100413140417/http://www.hartcomm.org/protocol/wihart/wireless_how_it_works.html [retrieved-on Nov. 26, 2012] XP002688183.

GB Search Report, dated Jan. 27, 2012, from corresponding GB application.

GB Search Report, dated Dec. 19, 2012, from corresponding GB application.

International Search Report, dated Nov. 29, 2012, from corresponding PCT application.

* cited by examiner

FLAME-PROOF RADIATION DETECTOR WITH WIRELESS COMMUNICATION MEANS

The present invention concerns a radiation detector which is able to communicate wirelessly with a remote location and which is can be used in a hazardous location in which potentially explosive gases may be present.

Radiation detectors are frequently used in applications such as scanning of structures or process vessels, such as distillation columns, for example, for the purpose of detecting faults and abnormal modes of operation. These operations may need to be carried out in areas where potentially explosive gas mixtures may be present, for example when scanning a process vessel in a chemical plant processing flammable materials. In most countries, the operation of apparatus in such areas is governed by legislation and such apparatus, particularly electrical apparatus, is controlled by various international standards, such as International Electrical Commission (IEC) 60079 which sets out the requirements, design parameters and tests for electrical equipment in order to minimise the risk of an explosion through electrical arcing or high surface temperatures. The use of radiation detectors for scanning or process monitoring involves the collection of data concerning the amount of radiation detected when the detector and a radiation source are in a particular location. In a typical scanning operation, a source of ionising radiation, often gamma radiation, is located so that a beam of the radiation passes through the structure or vessel to be scanned in the direction of a radiation detector. The amount, and sometimes also the energy, of the radiation received by the detector is measured in order to estimate the density of the material through which the radiation has passed. By comparing the detected radiation that has passed through different paths through the structure, it is possible to obtain information about the internal structure or contents and thereby identify problems such as a broken or missing internal part.

US2002/0056809 describes an armoured gamma detector which is installed in a rock drilling machine for use in mining operations. The gamma detector includes a scintillation element, a window, and a photo-metric module, including a photomultiplier tube and a logic element. The photo-metric module and window are encased within an explosion-proof housing. Cables connect the detector, located in the housing, to a control and display panel and carry data, communications signals and power to and from the detector within the housing.

The collection of radiation measurements is made more convenient by the use of radiation detectors which have associated wireless communication so that radiation measurements can be transmitted to a remote receiver as the scan progresses. The use of wireless communication in hazardous areas can present problems, however, because transmitter-receiver modules and aerials must meet the standards for safe operation mentioned above. In particular an aerial may present a risk of explosion due to electrical shorting. It is an object of the invention to provide an apparatus which overcomes some of the problems associated with wireless operation of radiation detectors.

According to the invention, we provide a radiation detector module comprising a radiation detector, power source and wireless communication means all housed within a flame-proof enclosure.

We further provide a method of manufacturing a radiation detector comprising the steps of:
a. providing a radiation detector, power source and wireless communication means;
b. providing a flame-proof enclosure comprising a housing body portion and at least one end cap, said body portion of said housing being made from metal and said end cap comprising a non-metallic material;
c. installing said radiation detector, power source and wireless communication means in said enclosure in such a way that, when the housing and at least one end cap are connected so as to form a flame-proof enclosure meeting the standards set out in BS EN 60079-1:2007, the wireless communication means can transmit communications signals to and receive communications signals from a location outside the enclosure.

We further provide a method of monitoring, at a first location, gamma radiation incidence at a second location comprising the steps of:
a. providing a radiation detector module at said second location, said radiation detector module comprising a radiation detector, power source and wireless communication means all housed within a flame-proof enclosure;
b. causing said radiation detector to detect and count gamma photons over a period of time; and
c. transmitting a wireless signal from the wireless communication means to a wireless signal receiver at said first location, said signal encoding data concerning the gamma photons counted by the radiation detector.

The method of the invention is particularly useful for use in radiation scanning methods, in which characteristics such as the density of a structure such as a storage tank, process vessel or process plant equipment, is calculated from the amount of gamma radiation emitted from a radiation source through the structure which is received by a radiation detector. The differences in radiation transmitted through different paths through the structure can reveal information about the composition, construction or contents of the structure.

Therefore, we further provide a method of measuring a characteristic of a structure, such as a process vessel, storage vessel or metallic apparatus, comprising the steps of:
a. providing a source of gamma radiation adjacent said structure
b. providing a radiation detector module at a second location in proximity to said structure such that gamma radiation from said source is transmitted along a path through a part of said structure towards said radiation detector module, said radiation detector module comprising a radiation detector, power source and wireless communication means all housed within a flame-proof enclosure;
c. causing said radiation detector to detect and count gamma photons over a period of time;
d. transmitting a wireless signal from the wireless communication means to a wireless signal receiver at location remote from said radiation detector module, said signal encoding data concerning the gamma photons counted by the radiation detector; and
e. calculating, from the data encoded in said signal, a characteristic of the structure which is dependent upon the amount of gamma radiation emitted from the source which is received by the radiation detector.

Normally the characteristic is measured at different locations to provide information about the structure based on changes in the measured characteristic when the radiation has passed along different paths through the structure.

The method of monitoring gamma radiation is particularly useful when said second location is a hazardous area, i.e. area in which an explosive gas atmosphere is present, or may be expected to be present, in quantities such as to require special precautions for the construction, installation and use of apparatus. Such conditions are often encountered in chemical manufacturing sites, oil exploration and refining operations etc. Explosive gas atmosphere means a mixture with air, under atmospheric conditions, of flammable substances in the form of gas or vapour in which, after ignition, combustion spreads throughout the unconsumed mixture. The second location may be a Zone 0, Zone 1 or Zone 2 hazardous area. In this specification, the terms "Zone 0", "Zone 1" and "Zone 2" have the meaning given in British Standard EN 60079-10: 2009 "Explosive atmospheres. Classification of areas. Explosive gas atmospheres. Part 10-1".

This specification refers to various parts of BS EN 60079, which is the European Standard for electrical equipment for explosive gas atmospheres. BS EN 60079 has been and will be updated from time to time. Whilst it is preferred that the features in this specification meet the EN 60079 standard in whichever version is currently in force, when a particular version of the standard is mentioned in this specification, the feature referred to meets at least the corresponding requirements set out in the version stated in the text.

The radiation detector module can be approved for use in a hazardous location, following testing according to the applicable standard, because any spark or explosion within the flame-proof enclosure is prevented from contacting the surrounding atmosphere. This type of protection is referred to in the standards, and commonly known as, "d" or "Ex-d". The requirements for such equipment and in particular of the enclosure, are set out in the British standard document BS EN 60079:2007 Explosive atmospheres. Equipment protected by flameproof enclosures "d" Part 1. In this specification, a "flame-proof enclosure" means an enclosure that meets the requirements of BS EN 60079-1:2007 such that any spark or explosion within the enclosure is prevented from contacting the surrounding atmosphere. BS EN 60079-1:2007 will be updated from time to time and it is preferred that the flame-proof enclosure meets the requirements set out in any relevant updated version of the standard. Preferably the radiation detector module also meets the requirements of at least one of the following US standards: FM 3600 (Electrical equipment for use in hazardous (Classified) locations) and FM3615 (Explosion Proof Electrical Equipment).

The flame-proof enclosure preferably comprises a housing having a body portion and at least one end cap. One or more of the end caps may form a lid. The housing body and end cap(s) preferably incorporate complementary threaded portions so that the housing may be closed by means of the end cap to form a closed enclosure. The end cap may be disengaged and the enclosure opened when access to the contents is required. The end cap and/or the housing body preferably are marked with a warning notice to warn the user not to open the enclosure when located in hazardous area. A locking means may be provided in order to reduce the risk of opening the enclosure unintentionally or to restrict opening the housing to authorised persons.

The housing is preferably generally cylindrical in cross-section in order to provide strength and explosion resistance. Other shapes may be used if suitable. The housing normally has the general form of a closed tube, defining a cavity. The part of the housing which engages the lid or end cap is preferably provided with a threaded potion, either internally or external. The lid is normally complementary in shape to the housing. The lid may be flat or, more preferably, has the form of a closed tube having a threaded portion internal or external to the part engaging the housing and complementary to a threaded part of the housing so that the lid and housing may together form a closed enclosure. The housing is preferably designed to have a shape which is capable of deflecting an impact so that the possibility of rupturing the housing in case of a fall is minimised. Suitably the ends of the housing and/or lid are designed to have a part-spherical, dome or conical shape. The material forming the housing body and end caps is selected to be of a thickness and durability appropriate for the requirements of a flame-proof enclosure. In one embodiment of the invention, a portion of the housing is formed from a metal such as steel.

The housing body and/or end cap may comprise means for attaching the radiation detector module to another object, such as a cable, loop, handle, collimator or hook. In one form the means comprises an eyelet and in a preferred form, the housing is provided with an eyelet at each end.

At least a portion of the walls of the enclosure is made from a material which is relatively more transmissive to the wireless communication transmissions than is steel. This portion of the enclosure wall may be referred to in this specification as the "relatively transmissive portion". Preferably the relatively transmissive portion of the walls is transmissive to radio-frequency waves, i.e. at least more transmissive to such waves than a similar thickness of steel. In a preferred embodiment a portion of the walls of the enclosure is made from a non-metallic material, such as a non-conductive plastics material. Particularly preferably the enclosure comprises a housing body made from metal and a lid or end cap made, at least partly, from a non-metallic material, especially preferably a plastics material. In order to comply with the standards for use of electrical equipment in hazardous areas, the non-metallic material should be a static dissipative material. Preferably the non-metallic material conforms to the requirements set out in Clause 7 of the EN 60079-0:2004 standard, or the latest version thereof, for the avoidance of build-up of static charge on the portion of the enclosure made from a non-metallic material. The material preferably has a surface resistance $\leq 1$ G$\Omega$ at $(23\pm2)°$ C. and $(50\pm5)\%$ relative humidity, when measured in accordance with the test given in Clause 26.13 of the EN 60079-0:2004 document. Suitable materials include polymers and plastics which are filled with carbon particles. Alternatively the portion of the enclosure wall made from a non-metallic material has a maximum surface area $\leq$ the values given in Clause 7 of the standard, these values being dependent upon the conditions in which the detector module is intended to be approved for. For example, when the detector module is to be approved as Group IIB for use in Zone 1 hazardous areas, the maximum surface area of non-metallic material exposed to the gas atmosphere which does not conform to the surface resistance specification given above is 10,000 mm$^2$.

The housing, housing body or the lid/end cap may include indicating means for providing information about the status of the radiation detector or information concerning the radiation measured by the detector. The indicating means may take the form of a variable display capable of displaying alphanumerics, graphics etc, indicator lights, and/or audible signals. In one form of the invention, the lid is provided with one or more indicator lights. The display may, in particular indicate the status or condition of a power supply within the enclosure, the range and operation of the wireless transmission means, a calibration, service date or other operation of the radiation detector. When the display comprises a light source, the colour, number of lights or continuity of illumination may be set to indicate a particular condition of the apparatus. The light source may be located inside the enclosure with light pipes provided to transmit light from the light source(s) to the external wall of the enclosure. The light pipes comprise an optically transmissive material, such as a polycarbonate, that passes through the material of the enclosure wall and is joined to the surrounding wall material by suitable means that do not adversely impact the strength of the enclosure or its ability to provide a flame-proof enclosure. In particular the join between light pipe material and surrounding wall material is resistant to the passage of gas and also mechanically and thermally resistant to shock. The light pipe is preferably joined to the enclosure wall material by means of a threaded engagement. The threaded engagement preferably meets the requirements set out in EN 60079-1:2007 relating to threaded joints. When the light pipe or display material does not achieve the maximum surface resistance requirements for use in hazardous areas, the exposed area of the light pipe should be maintained below the values given in Clause 7 of the EN 60079-0:2004 standard.

In a preferred embodiment, the invention comprises a radiation detector housed within a housing having a lid, the housing and lid together forming a gas-tight enclosure when the lid is closed, the lid being formed from a non-metallic, static dissipative material incorporating at least one light pipe extending through the lid between an external surface of the lid and the enclosure; the radiation detector having a light source for indicating one or more statuses associated with the radiation detector and the light pipe being arranged to transmit light from the light source to the external surface of the lid.

The enclosure houses a radiation detector, associated power source required to power the detector and any data processing or control apparatus provided for controlling the detector and handling signals produced by the detector in response to radiation detected. The nature of the detector is not usually an important feature of the invention. In practice the detector usually comprises an ion chamber device such as a Geiger-Müller (GM) tube or a scintillating material associated with a photodetector. The scintillating material may be any known and used for detecting radiation and many types are known to the skilled person. Sodium iodide crystals are common and widely used as scintillating materials for detecting radiation. Many other suitable inorganic materials are available and organic scintillators such as organic polymers may be suitable for particular applications. Liquid and gaseous scintillators are preferably not used because they are much more difficult to use in accordance with the hazardous area equipment standards. A scintillator must be used in conjunction with a photodetector for detecting and measuring the photons produced by the scintillator. Suitable photodetectors include photomultipliers and photodiodes, amongst others. The selection of the radiation detector is made according to the application for which it is to be used. Factors such as the type of radiation (e.g. beta or gamma), its energy and intensity would be routinely considered by the skilled person designing the radiation detector. For the purposes of scanning a structure such as a distillation column, one suitable radiation detector comprises a sodium iodide crystal scintillator and a photomultiplier tube (PMT). Preferably the radiation detector is adapted for the detection of gamma radiation. Gamma radiation is capable of penetrating a steel housing and the detection of radiation by the detector is not dependent on the provision of the relatively transmissive portion of the enclosure wall. The relatively transmissive portion is provided for the transmission of wireless communications, particularly radio-frequency signals.

The power source normally comprises at least one battery. In preferred embodiments the battery is rechargeable. The housing may be provided with a connector for connecting the battery to a charger and source of recharging power. In such a case a cover is provided to cover the connector in order to prevent access to the electrical contacts. The cover is removable or re-closable. The cover is preferably joined to the housing or lid by joining means which prevent the accidental or inadvertent removal of the cover. Preferably a warning is provided to alert the user of the requirement not to remove the cover in a hazardous area. As an alternative, the battery may be rechargeable by means which do not require a mechanical connection to be made, e.g. by means of induction.

In order to conserve power, the radiation detector is provided with a means to switch the power on and off as required. The means to switch off the power may take the form of a timer so that the detector is switched off after a certain period. A manually operable power switch may be provided to control the power. An external power switch may be difficult to protect to a standard sufficient to maintain hazardous area approval. In order to avoid providing a power switch on the external part of the housing, a switch may be provided inside the housing so that the detector must be switched on and off outside the hazardous area. More preferably an alternative means is provided to control the power. One such means includes remote operation using the wireless communication means to pass a control signal to the detector to operate the power switch. Another such means comprises an accelerometer located in the enclosure which is arranged to switch on the power when a suitable predetermined force is applied to the housing.

The wireless transmission means may be selected from any suitable means having sufficient signal properties for the application in which the detector is to be used. A significant factor in the selection of a suitable wireless transmission medium is the distance between the transmitter and receiver. We have found that for scanning operations, when the radiation detector is typically located within about 100 meters of a receiver, radio frequency (RF) transmission, i.e. transmissions in the radio frequency range, from about 3 kHz to 300 GHz, is suitable. A preferred embodiment therefore includes within the housing an RF transmitter/receiver which is adapted to transmit signals containing information about the radiation measured by the radiation detector. The wireless transmission means generally comprises an aerial or antenna. In a preferred embodiment, an aerial or antenna is located within the enclosure adjacent the relatively transmissive portion of the wall. In a particular embodiment, an aerial or antenna may be placed within the relatively transmissive portion, for example, within a channel formed in the material forming said portion or embedded in said portion.

The housing preferably contains a signal/data processor for operating on the electrical signal from the radiation detector. The signal may be subjected to smoothing or stabilisation algorithms, averaged or otherwise operated on according to standard practices. A data processor may perform calculations based on the signal from the radiation detector or from a signal processor if present. The data processor may output information concerning the amount of radiation measured over a time interval, or it may further calculate derived properties of the scanned structure, usually in the form of a bulk density or a change in bulk density between radiation paths through the structure. The data processor may contain a calibration or information concerning the radiation source. The data processor output is preferably connected to the wireless transmission means so that a wireless signal can be sent from the radiation detector module to a remote location. Alternatively a signal comprising data from the radiation detector itself may be sent, for processing at a remote location.

The transmission may be sent to a monitoring station within or outside the hazardous area. The monitoring station may comprise a data logger or, often a portable computer, adapted by means of suitable software to handle data from the radiation detector to produce a required output. The monitoring station includes a receiving and preferably also a transmitting means compatible with the wireless transmission means located within the housing of the radiation detector. When the monitoring station is to be used within a hazardous area it must be designed in such a way that it complies with the requirements for approval for use in such an area, according to the regulations on electrical apparatus for use in such areas. Preferably the monitoring station is suitably rugged to enable it to withstand use in such locations. The monitoring station may incorporate a signal and data processor and/or suitable software to calculate and information based on the signal produced by the radiation detector. The monitoring station may incorporate means to relay signals received from the radiation detector module to a further receiver/transmitter, for example located in a control room. In this way the range between the radiation detector module and a location receiving the data produced by the radiation detector may be increased beyond the normal range of the wireless transmission. The monitoring station and/or a further receiving device may incorporate means to send or receive a signal to any of several radiation detector modules located remotely. The monitoring and/or a further receiving device preferable includes control software which may be used to control the radiation detector module by means of signals transmitted to the module by means of the wireless transmission means.

Figure 2:
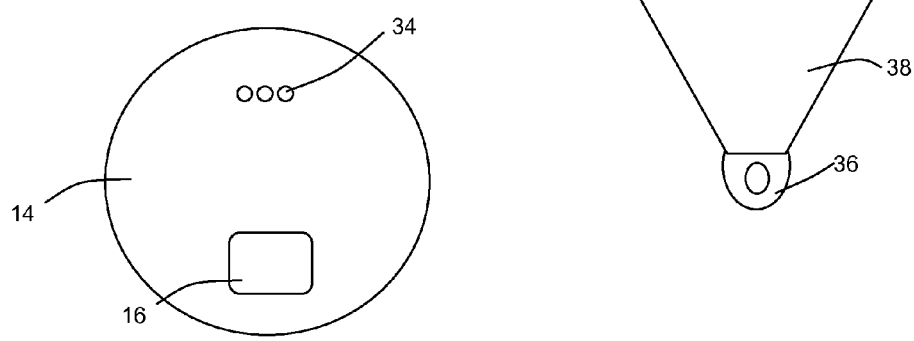

One embodiment of the invention will be further described, by way of example only, with reference to the accompanying drawings, which are:

FIG. 1: a schematic view of a longitudinal section through a radiation detector module according to the invention;

FIG. 2: a schematic plan view of the external end surface of the lid; and

Figure 3:
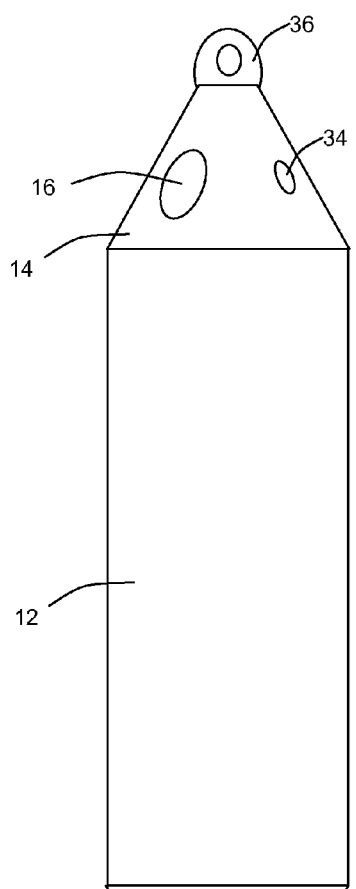

FIG. 3: a schematic view of an alternative form of radiation detector module according to the invention.

FIGS. 1 and 2 show a radiation monitor module 10 comprising a steel housing 12 and a lid 14 made from carbon-loaded nylon. The upper part of the external walls of the housing has a threaded portion 18 for engaging with a complementary threaded portion in the inner wall of the lid. When the housing is closed by the lid, the lid and housing together enclose a space 15 for housing the power supply and radiation detector. The housing and lid are constructed according to the provisions set out in EN 60079, parts 0 and 1 so that the housing and lid, together conform to the requirements for a "flameproof enclosure".

The housing contains a radiation detector comprising a sodium iodide scintillation crystal 20 which is optically coupled to a photomultiplier 22. The PMT is connected to a circuit board 26 which carries a microprocessor which is programmed with signal processing algorithms and data processing and calculating software for producing data relating to the output from the PMT. A tagged D-cell battery 24, provides power for the detector and is also connected to a circuit board 28 carrying a radio-frequency transmitter/receiver/wireless modem to transmit signals from the microprocessor via aerial 30 to a remote location equipped with a receiver for receiving the RF signals. Aerial 30 is housed within a blind channel in the lid. A block of three LEDs 32 is mounted on the circuit board 28 adjacent polycarbonate light pipes 34 which pass through the wall of the lid by means of a threaded joint. The LEDs operate in response to signals representing a condition of the radiation monitor or its power source. A connector for recharging the battery is also present within the lid. The connecter is covered by cover 16.

An alternative form of the radiation detector module is shown in FIG. 3. The steel housing 12 is a cylinder capped by two conical end caps, one of which comprises the lid 14, incorporating the LED light pipes 34 and charging connector cover 16. The other end cap 38 is a solid cap, joined to the cylindrical housing by means of a threaded connection. Both end caps have eyelets 36 for connection of the module to a cable for use in radiographic scanning of a structure. The second end cap 38 may, of course, incorporate components such as light pipes, connectors or communications equipment if required. The conical end caps make the detector module more resistant to impact than a detector having a flat end.

The invention claimed is:

1. A radiation detector module comprising a radiation detector, a power source and a wireless communication means all housed within a flame-proof enclosure,
    wherein said flame-proof enclosure comprises a housing comprising a body portion and at least one end cap, the body portion of said housing being made from metal and the end cap comprises a non-metallic material, and
    at least a portion of walls of the flame-proof enclosure is made from a non-metallic material that is more transmissive to wireless transmission than is steel,
    said non-metallic material being a static dissipative plastics material having a surface resistance ≤1 GΩ at 23° C.±2° C. and 50%±5% relative humidity, when measured in accordance with clause 26.13 of BS EN 60079-0:2004.

2. The radiation detector module according to claim 1, wherein the non-metallic material forming an external surface of the flame-proof enclosure has a maximum surface area of 10,000 mm$^2$.

3. The radiation detector module according to claim 1, wherein the housing or the end cap includes an indicator configured for providing information about the status of the radiation detector or information concerning the radiation measured by the detector.

4. The radiation detector module according to claim 3, wherein the indicator comprises a light source located inside the enclosure and optically connected to at least one light pipe comprising an optically transmissive material that passes through the enclosure wall to an external surface of the enclosure.

5. The radiation detector module according to claim 1, wherein the wireless communication means comprises a radio-frequency transmitter, an aerial, and optionally a radio-frequency receiver.

6. The radiation detector module according to claim 1, wherein an aerial or antenna associated with said wireless communication means is located within the flame-proof enclosure adjacent to a portion of the wall that is transmissive to said wireless communication.

7. The radiation detector module according to claim 1, wherein the radiation detector is provided with a switching element to switch the power on and off, said switching element comprising an accelerometer located within the enclosure and which is arranged to switch on the power when a predetermined force is applied to the housing.

8. A method of monitoring, at a first location, gamma radiation incidence at a second location comprising the steps of:
    a) providing a radiation detector module at said second location, said radiation detector module being the radiation detector module according to claim 1;
    b) causing said radiation detector to detect and count gamma photons over a period of time; and
    c) transmitting a wireless signal from the wireless communication means to a wireless signal receiver at said first location, said signal encoding data concerning the gamma photons counted by the radiation detector, said first location being outside the flame-proof enclosure and remote from the second location.

9. A method of measuring a characteristic of a structure, comprising the steps of:
   a) providing a source of gamma radiation adjacent said structure;
   b) monitoring the gamma radiation incidence at a second location in proximity to said structure, said second location being selected such that gamma radiation from said source is transmitted along a path through a part of said structure towards said second location, wherein said monitoring is carried out according to the method of claim 8; and
   c) calculating, from the data encoded in said signal, a characteristic of the structure which is dependent upon the amount of gamma radiation emitted from the source that is received by the radiation detector.

10. The method according to claim 9, wherein said structure is a process vessel, storage vessel or metallic apparatus.

11. A method of manufacturing a radiation detector, comprising the steps of:
   a) providing a radiation detector, power source and wireless communication means,
   b) providing a flame-proof enclosure comprising a housing body portion and at least one end cap, said body portion of said housing being made from metal and said end cap comprising a non-metallic material,
   c) installing said radiation detector, power source and wireless communication means in said enclosure in such a way that, when the housing and at least one end cap are connected so as to form a flame-proof enclosure meeting the standards set out in BS EN 60079-1:2007, the wireless communication means can transmit communications signals to and receive communications signals from a location outside the enclosure.

* * * * *